No. 874,231. PATENTED DEC. 17, 1907.
T. OLSON.
AUTOMATIC WATERING TROUGH.
APPLICATION FILED MAR. 28, 1906.
2 SHEETS—SHEET 1.
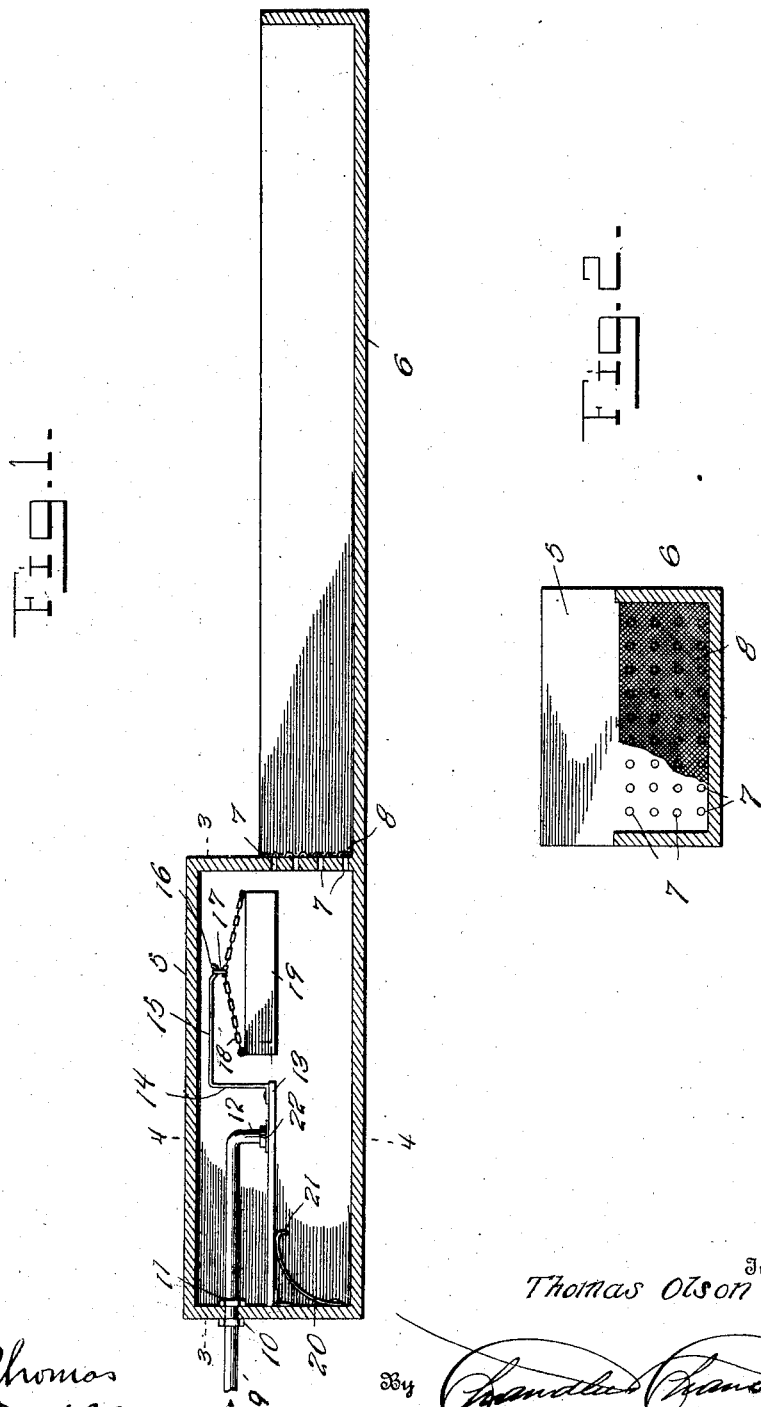
Witnesses
G. R. Thomas
J. C. Jones
Inventor
Thomas Olson
By Chandler & Chandler
Attorneys No. 874,231. PATENTED DEC. 17, 1907.
T. OLSON.
AUTOMATIC WATERING TROUGH.
APPLICATION FILED MAR. 28, 1906.
2 SHEETS—SHEET 2.
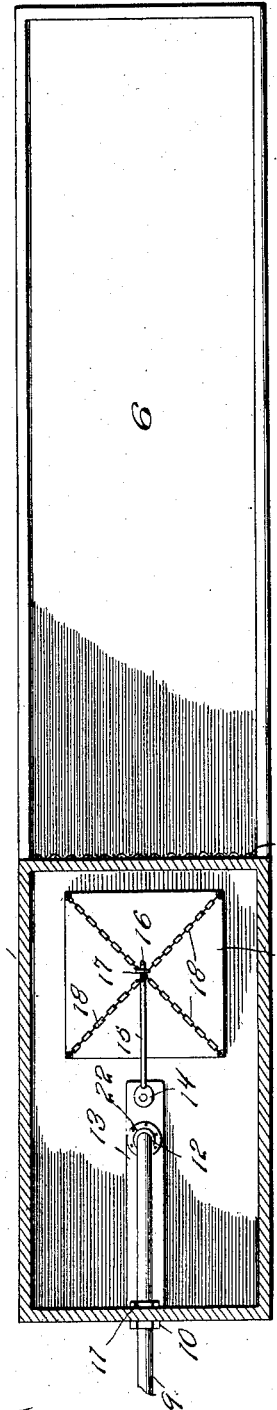
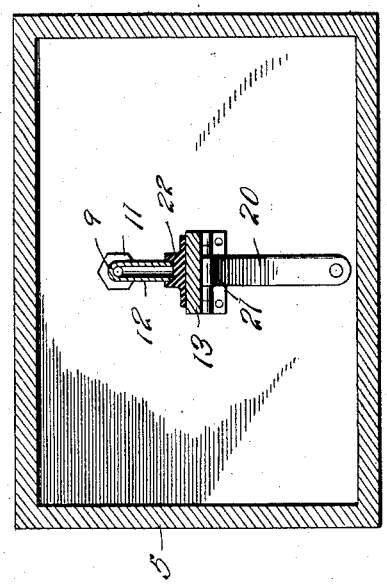
Witnesses
G. R. Thomas
J. C. Jones
Inventor
Thomas Olson
By Chandler & Chandler
Attorneys

UNITED STATES PATENT OFFICE.

THOMAS OLSON, OF NORTHWOOD, NORTH DAKOTA.

AUTOMATIC WATERING-TROUGH.

No. 874,231.      Specification of Letters Patent.      Patented Dec. 17, 1907.

Application filed March 28, 1906. Serial No. 308,614.

*To all whom it may concern:*

Be it known that I, THOMAS OLSON, a citizen of the United States, residing at Northwood, in the county of Grand Forks, State of North Dakota, have invented certain new and useful Improvements in Automatic Watering-Troughs; and I do hereby declare the following to be a full, clear, and exact description of the invention, such as will enable others skilled in the art to which it appertains to make and use the same.

This invention relates to automatic watering troughs and has for its object to provide a construction of this nature which will automatically maintain a constant water level in the trough proper thereof.

A further object of the invention is to provide means for excluding sticks or other foreign matter from the working parts of the device, and thereby insure proper working of the same.

In the accompanying drawings, Figure 1 is a vertical longitudinal sectional view through the device. Fig. 2 is a front elevation of the same with the front of the trough proper broken away. Fig. 3 is a horizontal sectional view on the line 3—3 of Fig. 1, and Fig. 4 is a detail sectional view on the line 4—4 of Fig. 1.

Referring to the drawings, the numeral 5 denotes a casing which is preferably rectangular in form and which is provided at its forward end with a trough 6 which is of less height than the casing. The casing 5 is closed on all sides and through its front is formed a plurality of openings 7, the uppermost ones of which are in a plane below that occupied by the upper edge of the trough proper 6. Over the perforated portion of the front of the casing is secured a sheet of wire gauze or other foraminous material 8.

Engaged through an opening in the rear end of the casing is a supply pipe 9 which leads from any desired source of water supply (not shown), the said pipe being firmly held in position by means of nuts 10 and 11 which are engaged upon the pipe upon opposite sides of the said rear wall of the casing. The inner end of the supply pipe 9 is turned downwardly as at 12 at right angles to its remaining portion.

Hinged at one of its ends to the rear of the casing is a beam 13 which is arranged to contact with the outlet end of the supply pipe 9 when the former is in a horizontal position. Secured to the free end of the beam 13 is one end of a bracket 14 which extends upwardly from the said end of the beam and thence forwardly at right angles to its upwardly extending portion as at 15. The extreme forward end of the portion 15 of the bracket is hooked as at 16 and engaged with the hooked portion is a ring 17 from which is suspended by means of chains 18, a float 19, of wood or other suitable material.

In order to firmly hold the beam against the outlet end of the pipe 9, when the trough proper is full, a leaf spring 20 is secured at one of its ends to the rear of the casing and has its other end bearing against the under side of the beam 13, and in order to allow free movement of the spring along the under side of the beam during the movement of the latter, the upper end of the spring is bent over as at 21.

To positively cut off the flow of water when the trough 6 is full, I secure upon the upper side of the beam 13, a cup-shaped rubber nipple 22 into which the outlet end of the pipe 9 seats. It will be readily seen that as the water in the trough 6 is consumed, the float 19 lowers, allowing more water to enter.

What is claimed is:

A device of the class described comprising a closed casing, a trough leading from one end of the casing, the said end of the casing being provided with a plurality of openings, a wire screen stretched across the said end of the casing and having a mesh finer than the openings therein, a pipe leading into the casing at the end opposite to the perforated end and adjacent the top of the casing, the said pipe having its inner end turned downwardly at right angles and terminating in a plane slightly below the upper edge of the trough, a beam hinged to that end of the casing through which the pipe extends and projecting toward the perforated end of the casing, a leaf spring secured to the end of the casing to which the beam is hinged and extending upwardly and beneath the beam and having its end overturned, a valve fixed upon the beam and adapted to receive the lower end of the pipe and to be held yieldably in such engagement with the pipe by the action of the spring, a bracket secured to the upper face of the beam at its extreme inner end and extending upwardly and thence at right angles beneath the top of the casing, the end of the bracket being terminated short of the perforated end of the casing, and a float supported by flexible connection over the said end of the bracket substantially as described.

In testimony whereof, I affix my signature, in presence of two witnesses.

THOMAS OLSON.

Witnesses:
 HENRY EIDM,
 EDWIN ERSTAD.